United States Patent
Krueger et al.

(10) Patent No.: US 8,645,040 B2
(45) Date of Patent: Feb. 4, 2014

(54) METHOD FOR OPERATING A VEHICLE BRAKE SYSTEM

(75) Inventors: Eric E. Krueger, Chelsea, MI (US); Kevin S. Kidston, New Hudson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 583 days.

(21) Appl. No.: 12/775,043

(22) Filed: May 6, 2010

(65) Prior Publication Data

US 2011/0276245 A1 Nov. 10, 2011

(51) Int. Cl.
*B60B 39/00* (2006.01)

(52) U.S. Cl.
USPC .......... 701/71; 701/70; 701/80; 303/152

(58) Field of Classification Search
USPC ........... 701/70, 71, 78, 80, 82, 83; 303/152
See application file for complete search history.

(56) References Cited

U.S. PATENT DOCUMENTS

| | | | |
|---|---|---|---|
| 5,948,961 A | 9/1999 | Asano et al. | |
| 6,435,627 B1 * | 8/2002 | Roll et al. | 303/173 |
| 6,704,635 B2 * | 3/2004 | Walenty et al. | 701/71 |
| 6,709,075 B1 * | 3/2004 | Crombez et al. | 303/152 |
| 6,728,620 B2 * | 4/2004 | Anwar | 701/70 |
| 7,575,287 B2 * | 8/2009 | Matsuura et al. | 303/152 |
| 7,654,620 B2 * | 2/2010 | Jeon et al. | 303/152 |
| 7,853,389 B2 * | 12/2010 | Luehrsen et al. | 701/82 |
| 8,019,520 B2 * | 9/2011 | Osaki et al. | 701/69 |
| 2004/0015279 A1 * | 1/2004 | Barron et al. | 701/37 |
| 2007/0108838 A1 * | 5/2007 | Shaffer et al. | 303/152 |
| 2008/0100132 A1 * | 5/2008 | Jeon et al. | 303/152 |
| 2008/0183353 A1 * | 7/2008 | Post et al. | 701/42 |
| 2009/0099744 A1 * | 4/2009 | Karnjate et al. | 701/70 |
| 2010/0113215 A1 * | 5/2010 | Jager et al. | 477/29 |
| 2011/0130937 A1 * | 6/2011 | Krueger et al. | 701/74 |
| 2011/0221265 A1 * | 9/2011 | Busack et al. | 303/152 |

* cited by examiner

*Primary Examiner* — James English
(74) *Attorney, Agent, or Firm* — Lionel D. Anderson; Reising Ethington P.C.

(57) ABSTRACT

A method for operating a vehicle brake system during a wheel slip condition. According to an exemplary embodiment, the method involves receiving a requested brake torque, monitoring wheel slip, and if no wheel slip is detected then operating the vehicle brake system according to the requested brake torque. If, however, wheel slip is detected then the method may operate the vehicle brake system according to a modified brake torque that is less than the requested brake torque.

13 Claims, 3 Drawing Sheets

US 8,645,040 B2

METHOD FOR OPERATING A VEHICLE BRAKE SYSTEM

TECHNICAL FIELD

The present invention generally relates to a vehicle brake system and, more particularly, to a method of operating a vehicle brake system during wheel slip conditions.

BACKGROUND

Antilock braking systems (ABSs) have been developed and employed in vehicles in order to increase tire traction, to reduce wheel slippage, and to generally improve the vehicle's braking performance on slippery or other challenging road surfaces. When an ABS is active, the amount of brake torque requested by the driver (i.e., the driver braking intent) may be much higher than the brake torque actually being applied by the ABS at the wheels. A significant discrepancy between the requested brake torque and the actual brake torque can correspondingly cause a significant pressure drop or differential across one or more valves in the ABS or some other part of the vehicle brake system. This, in turn, can make it difficult to operate the vehicle brake system in an optimum manner.

SUMMARY

According to one embodiment, there is provided a method for operating a vehicle brake system, comprising the steps of: (a) receiving a requested brake torque; (b) monitoring wheel slip; and (c) if no wheel slip is detected then operating the vehicle brake system according to the requested brake torque, and if wheel slip is detected then operating the vehicle brake system according to a modified brake torque that is less than the requested brake torque.

According to another embodiment, there is provided a method for operating a vehicle brake system that is a brake-by-wire system and has an antilock braking system (ABS), comprising the steps of: (a) receiving a requested brake torque from a brake pedal sensor; (b) assessing a road surface condition; (c) monitoring wheel slip, if wheel slip is detected then determining the total brake torque being applied at the moment of wheel slip; (d) using the assessed road surface condition from step (b) and the total brake torque at wheel slip from step (c) to determine a modified brake torque that is less than the requested brake torque; and (e) operating the vehicle brake system according to the modified brake torque so that the difference between the modified brake torque and a target brake torque from the ABS is smaller than the difference between the requested brake torque and the target brake torque.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

When wheel slip is detected, the method described herein modifies or limits the requested brake torque from the driver in order to improve the performance of the vehicle brake system. By limiting the requested brake torque during wheel slip situations, the present method may be able to improve the deceleration of the vehicle, reduce the noise and vibration emanating from the vehicle brake system, and/or increase the fuel economy of the vehicle. Although this method is particularly well suited for use with an electrohydraulic braking (EHB) system having antilock brakes, such as the exemplary one shown in FIG. 1, it may be used with any number of other braking systems and is not limited to the particular embodiment shown here. For example, the present method may be used with any type of brake-by-wire system where there is some type of decoupling between the brake pedal and the vehicle brakes. This includes, but is certainly not limited to, regenerative and non-regenerative braking systems, as well as other brake technologies like drum brakes, etc. These are only some of the possibilities, as the present method could be used with other vehicle brake systems as well.

Figure 1:
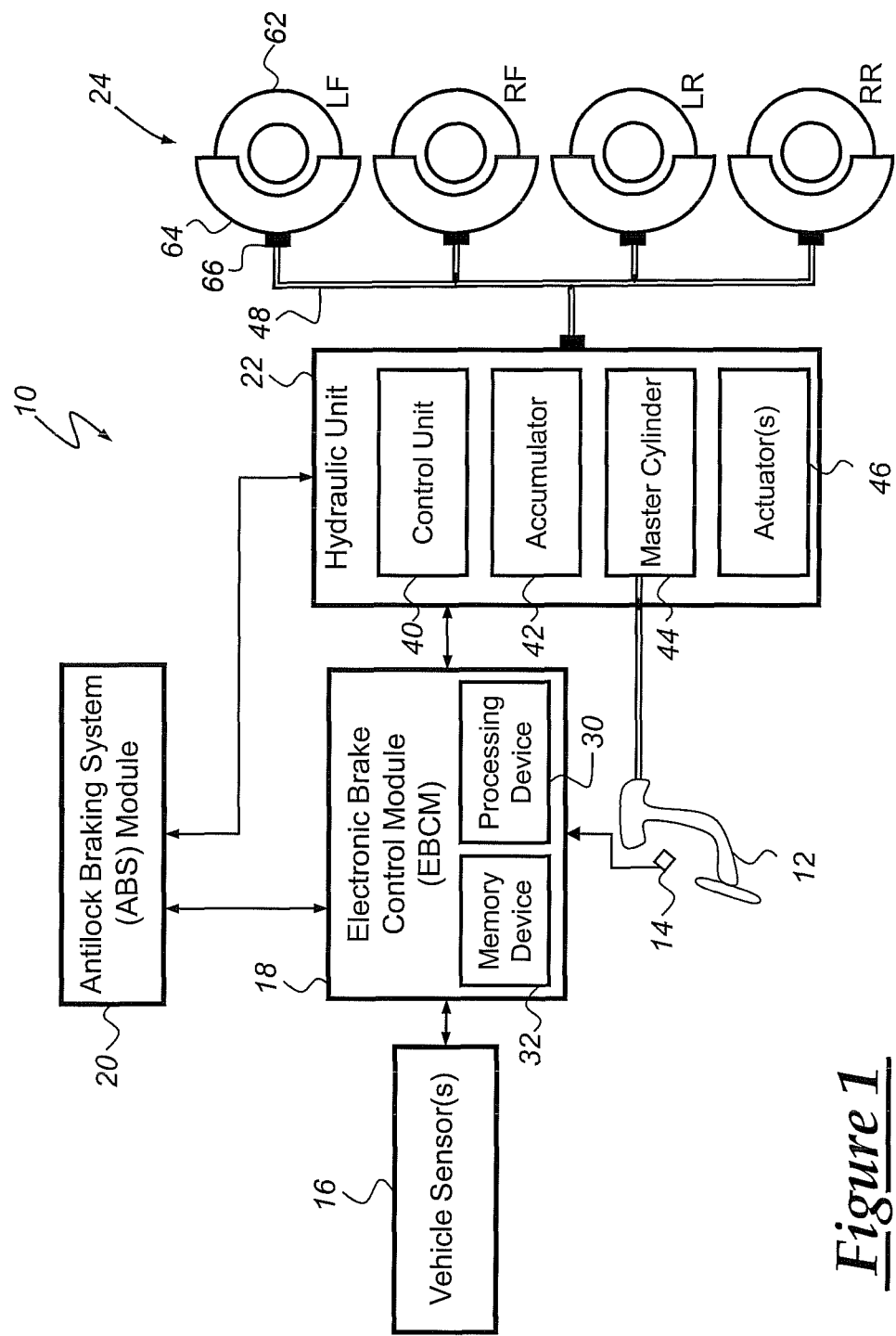
FIG. 1 is a block diagram of an exemplary vehicle brake system.

With reference to FIG. 1, there is shown a block diagram of an exemplary vehicle brake system 10 that is an electrohydraulic braking (EHB) system and generally includes a brake pedal 12, a brake pedal sensor 14, other vehicle sensors 16, an electronic module 18, an antilock braking system (ABS) module 20, a hydraulic unit 22, and a disc brake unit 24. Vehicle brake system 10 may or may not be part of a hybrid vehicle that utilizes a combination of frictional and regenerative braking forces to slow down the vehicle. In a hybrid arrangement, frictional braking forces may be generated in a conventional manner and counteract the forward momentum of the vehicle through friction created by disk brakes, drum brakes, etc. Regenerative braking forces may be generated by operating an electric motor in a reverse direction so that it acts as a generator, which in turn creates an electromagnetically-derived torque that acts against the forward momentum of the vehicle (this process also charges a battery that can later be used to power the hybrid vehicle).

Brake pedal 12 is a pedal or lever that is operated by the driver and, according to this particular embodiment, is monitored by brake pedal sensor 14. In a brake-by-wire application, like the exemplary EHB system shown here, brake pedal 12 may be mechanically coupled to a brake pedal simulator or emulator by way of a spring mechanism or the like for conveying the expected mechanical feel to the driver. The brake pedal simulator may also include other mechanical and/or electronic components, including sensors, etc. Skilled artisans will appreciate that brake pedal 12 may also be mechanically coupled to a master cylinder, for example, which acts as a mechanical backup in the event that the brake-by-wire system experiences some type of malfunction.

Brake pedal sensor 14 monitors the position, movement, exerted force, and/or state of brake pedal 12 and provides vehicle brake system 10 with an input signal that is representative of the requested brake torque (also known as the driver braking intent). Any number of different types of brake pedal sensors may be used; these include non-contact-type sensors (e.g., optical sensors, electro-magnetic sensors, etc.), contact-type sensors (e.g., potentiometers, contact switches, etc.), as well as those that measure the force that the driver exerts against the brake pedal, to name a few.

Vehicle sensors 16 may include any combination of components, devices, modules, systems, etc. that measure: wheel speed, wheel acceleration, vehicle speed, vehicle acceleration, frictional brake torque, regenerative brake torque, tire pressure, vehicle mass, yaw rate, steering angle, road grade, weather conditions, or any other vehicle operating parameters that may be useful to method 100. One or more of the aforementioned vehicle sensors 16 may be embodied in hardware, software, firmware, or some combination thereof, and may be electronically coupled to electronic module 18 via a direct electronic connection (as is schematically illustrated in FIG. 1), via other electronic components such as other devices, modules, systems, etc., via a vehicle communications bus or network, or via some other connection known in the art.

Electronic module 18 is an electronic device or unit that is located in the vehicle and includes an electronic processing device 30 and an electronic memory device 32. Electronic processing device 30 may control certain operational aspects of vehicle brake system 10 by executing various electronic instructions, including those of the present method. Some examples of suitable electronic processing devices include digital and analog microprocessors, microcontrollers, application specific integrated circuits (ASICs), or any other processing device known in the art. Electronic memory device 32 may include any type of electronic memory storage means and may be used to store some of the electronic instructions that make up the present method, as well as sensor readings, look-up tables, and any other data structure that may hold data used by the method described herein. According to one embodiment, electronic module 18 is an electronic brake control module (EBCM) that processes signals from brake pedal sensor 14 and antilock braking system (ABS) module 20, makes modifications to the requested brake torque when necessary, and sends corresponding command signals to hydraulic unit 22. Electronic brake control module (EBCM) 18 can be a separate or stand-alone electronic module (as illustrated here) or it can be integrated into another module, device, or system such as a traction control system or ABS module 20, to cite two possibilities.

Antilock braking system (ABS) module 20 works with the vehicle brake system when it detects certain wheel slip environments. In one embodiment, ABS module 20 monitors the deceleration rates of the various vehicle wheels and, if a wheel slip condition is detected, then the ABS module momentarily reduces the hydraulic pressure to the wheel or corner that is experiencing the wheel slip. Once the rate of deceleration for the affected wheel comes back in line with the others (e.g., by regaining traction), normal hydraulic pressure can be restored such that normal braking continues. One way for ABS module 20 to accomplish this is by controlling electrically-operated solenoid valves that hold, release and reapply hydraulic pressure to the different disk brake units 24; modulating the hydraulic pressure like this oftentimes results in a pulsating effect that can be felt by the driver. Skilled artisans should appreciate that there are a variety of ABS systems and types that can be employed including ones having different numbers of channels and/or sensors. Although the ABS module 20 is schematically shown in FIG. 1 as being connected to EBCM 18 and hydraulic unit 22, it is certainly possible for the ABS module to be provided according to other arrangements and to be connected to other suitable devices within the vehicle. ABS module 20 can be a separate or stand-alone electronic module (as shown in FIG. 1) or it can be integrated into another module, device, or system such as a traction control system or EBCM 18 or hydraulic unit 22, to cite several possibilities.

Hydraulic unit 22 is mounted in the vehicle and is part of a hydraulic system that can drive brake pistons located at each of the vehicle wheels or corners. Although hydraulic unit 22 is schematically shown as having a separate hydraulic control unit 40, accumulator 42, master cylinder 44, and actuator(s) 46 co-located with one another, it should be appreciated that any combination of these and/or other devices could instead be provided according to some other arrangement known in the art. For example, hydraulic control unit 40 could be integrated within EBCM 18 or some other module and be connected to actuator(s) 46 via electrical connections. Hydraulic control unit 40 may interact with EBCM 18 and/or ABS module 20 and may act as an intermediary or driver for the various electromechanical valves, actuators and/or other devices of hydraulic unit 22. In one example, hydraulic control unit 40 receives command signals from EBCM 18, processes those signals, and uses them to operate actuator(s) 46. Skilled artisans will appreciate that hydraulic control unit 40 may perform any number of different tasks and execute a variety of different instructions, including those of the present method.

Accumulator 42 uses compressed gas and hydraulic fluid to provide fluid pressure for the hydraulic system, as is known in the art. According to an exemplary embodiment, accumulator 42 includes a cylinder and a free riding piston or neoprene diaphragm that separates a gas on one side of the piston—for example, nitrogen—and hydraulic fluid on the other side. The compressible gas is introduced through a valve at one end of the cylinder while the hydraulic fluid enters at the other end of the cylinder. As the hydraulic fluid enters the cylinder, it forces the free riding piston or neoprene diaphragm against the compressible gas, compressing it to a predetermined pressure. In a non-emergency situation, accumulator 42 may be set to a predetermined pressure, such as 140-180 bar; this in turn, enables the hydraulic system to have on-demand pressure when requested by hydraulic control unit 40. In an emergency situation, accumulator 42 may store energy for a limited number of brake applications in the event the engine stops running. Other devices and arrangements may be used, as a nitrogen-based accumulator is simply exemplary.

Master cylinder 44 is mechanically coupled to brake pedal 12 and, in the event of a malfunction, can be used to mechanically engage the vehicle brake system 10. There are many different types of master cylinder arrangements that may be used, including ones that have one or more pistons (e.g. primary piston, secondary piston, etc.). In one exemplary embodiment, a primary piston (not shown) is mechanically coupled to brake pedal 12 and moves back-and-forth in response to engagement by the driver's foot. If an electronic or other type of malfunction were to occur, the driver can still depress brake pedal 12 such that it advances the primary piston and forces it into contact with one or more secondary pistons. Further engagement of brake pedal 12 by the driver causes the secondary pistons to compress the brake fluid and increase the fluid pressure out at one or more disk brake units 24, which in turn causes a piston to drive a caliper and brake pad against a rotor and create a frictional force that slows the vehicle down.

Actuator(s) 46 are electromechanical devices that control the fluid pressure in hydraulic lines 48 and, according to this particular embodiment, are controlled by command signals provided by EBCM 18, ABS module 20, control unit 40 and/or some other device. Depending on the particular arrangement, actuator(s) 46 can include any combination of solenoids, valves, pumps, and other devices that can be controlled by electronic command signals and can manipulate the fluid pressure in the hydraulic system. In one embodiment, actuator(s) 46 include: a boost valve for fluidly connecting accumulator 42 to hydraulic lines 48 and providing elevated fluid pressure in the hydraulic system, a number of isolation valves for fluidly connecting the output of the boost valve to the disk brake units located at each of the vehicle wheels, and a number of dump valves for releasing the fluid pressure in the hydraulic system once a braking event is finished. Other components and devices could be included within actuator(s) 46.

Disk brake unit 24 generally includes a rotor 62, caliper 64, piston 66, and brake pads (not shown) and may be part of an electrohydraulic braking (EHB) system or some other brake system. As is appreciated by skilled artisans, a tire-wheel assembly (not shown) is attached to a hub with several lug nuts so that the tire, wheel, hub, and rotor 62 can all co-rotate together. Brake caliper 64 straddles rotor 62 and carries brake piston 66 so that a compressive and frictional brake force can be applied by brake pads to opposing sides of the rotor during a braking event. The frictional brake forces slow the rotation of rotor 62 and hence the rotation of the tire-wheel assembly and ultimately the vehicle. The brake pistons for each of the different wheels or corners may be: all controlled in unison, controlled on a wheel-by-wheel basis, controlled in groups (e.g., the front wheels are controlled separately from the rear wheels), or controlled according to some other known method. It should be appreciated that the method and system described herein are not limited to use with disk brake systems and could be used with other braking systems and arrangements, including drum brake systems.

In general operation, a driver engages brake pedal 12 to slow down or stop the vehicle. The depression or engagement of brake pedal 12 is sensed by brake pedal sensor 14, which provides the system with an input signal that is generally representative of the requested brake torque or driver braking intent. In one embodiment, the input signal is sent to EBCM 18 which uses the requested brake torque in the execution of one or more algorithms, such as the exemplary method described herein. From these algorithms or methods, EBCM 18 generates one or more command signals that are provided to hydraulic control unit 40 and are used to control one or more actuator(s) 46, such as boost, isolation and dump valves. These valves can control the fluid pressure in hydraulic lines 48 which lead to the front and/or rear wheels. By controlling the fluid pressure in hydraulic lines 48, the vehicle brake system is able to control the brake force and ultimately the brake torque exerted by disk brake units 24.

Again, it should be appreciated that the preceding description of vehicle brake system 10 is exemplary and is only provided for purposes of illustration. The method described herein may be used with any number of different vehicle brake systems and is not limited to these exemplary embodiments. For instance, the EBCM 18, ABS module 20, hydraulic unit 22, disk brake units 24, as well as the components thereof, are merely exemplary and could be substituted with other designs and embodiments known to those skilled in the art.

Figure 2:
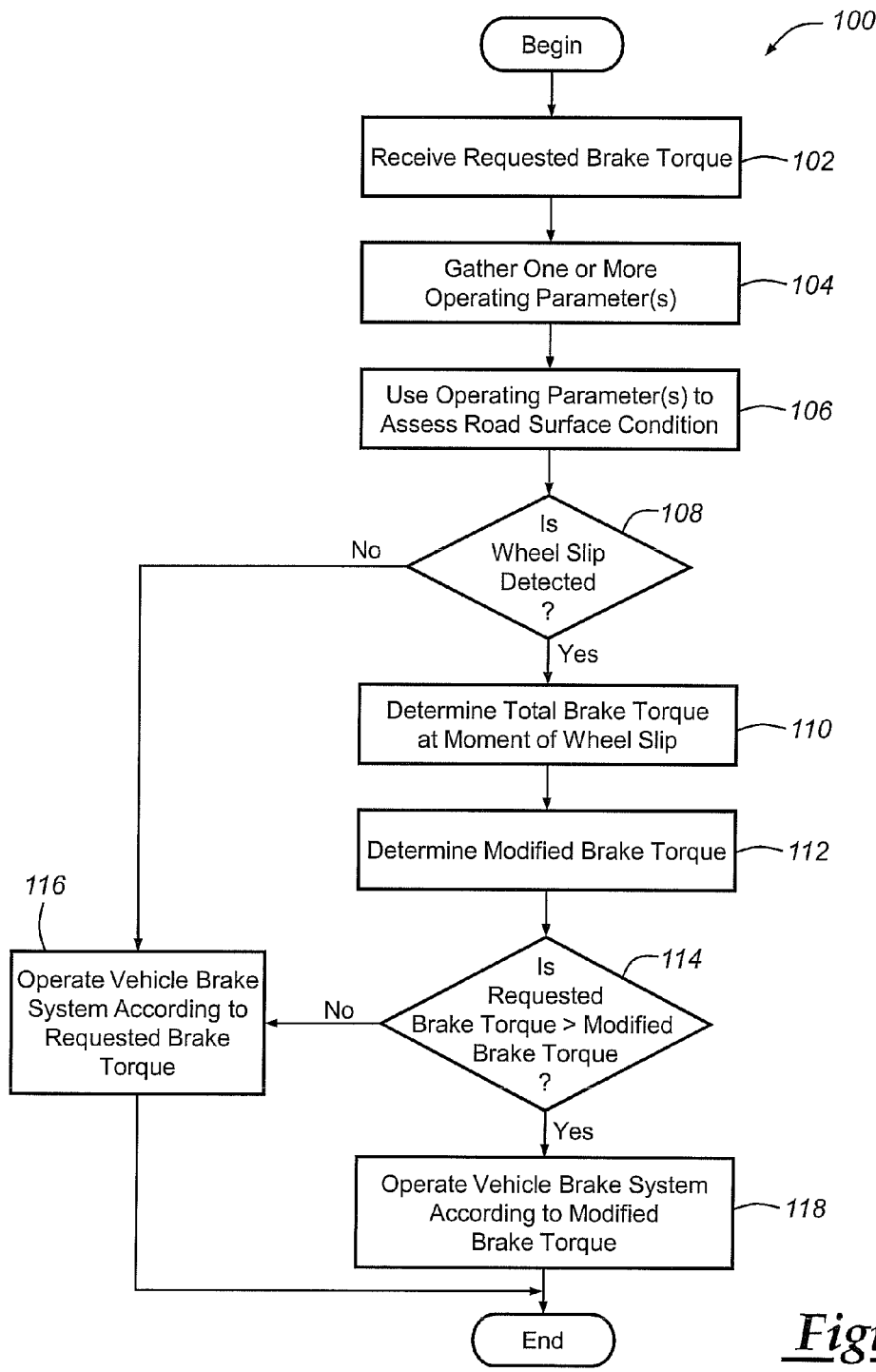
FIG. 2 is a flowchart of an exemplary method that may be used to operate the vehicle brake system of FIG. 1.

Turning now to FIG. 2, there is shown a flowchart of an exemplary method 100 for operating a vehicle brake system, such as vehicle brake system 10 which is a brake-by-wire system with antilock braking features. Because of the decoupled nature of a brake-by-wire system, method 100 is able to make changes or modifications to a requested brake torque such that the brake torque actually experienced at the vehicle wheels is different than the brake torque requested by the driver. In one embodiment, method 100 actually decreases the requested brake torque from the driver in order to improve the braking performance of the vehicle. The following description oftentimes describes method 100 in terms of brake torque, but skilled artisans will appreciate that this description is equally applicable to brake force, brake fluid pressure, as well as any other suitable braking parameter related to brake torque. Again, method 100 may be used with other brake-by-wire systems and is not limited to the exemplary electrohydraulic brake (EHB) system 10 that is shown in FIG. 1.

Beginning with step 102, the method receives a requested brake torque according to one of a number of different techniques. For example, a brake input signal may be received from brake pedal sensor 14 at electronic brake control module (EBCM) 18, where the brake input signal includes information relating to the position, movement, exerted force, and/or state of brake pedal 12 (i.e., the 'brake status') and is generally representative of the requested brake torque. The brake status provides an indication of the driver braking intent and may be gathered by EBCM 18 on a periodic basis (e.g., every 50 ms), may be provided by brake pedal sensor 14 on an event-driven basis (e.g., when the driver depresses brake pedal 12 beyond a certain point), or according to some other basis known in the art. EBCM 18 may use a variety of different signal processing techniques to filter, convert, evaluate, analyze and/or otherwise process the incoming brake input signals and to discern the requested brake torque. Other techniques and methods can be used to determine requested brake torque instead, as the aforementioned examples only represent some of the possibilities. It should be appreciated that "requested brake torque" and "driver braking intent" may be used interchangeably herein.

Next, step 104 gathers one or more operating parameter(s) from around the vehicle. These operating parameters may be used in subsequent evaluations and, depending on the particular embodiment, may include: wheel speed, wheel acceleration, vehicle speed, vehicle acceleration, frictional brake torque, regenerative brake torque, tire pressure, vehicle mass, road grade or outside weather conditions, to cite a few possibilities. In the exemplary embodiment of FIG. 1, discrete vehicle sensors 16 provide these operating parameters, however, they may be provided instead by different components, modules and/or systems located around the vehicle. For example, wheel speed readings may be provided by a stability control system, an anti-lock braking system (ABS) or a tire pressure monitoring system (TPMS); vehicle acceleration readings may be provided by some type of on-board accelerometer; and weather conditions may be telematically provided by some type of wireless telematics unit, to name a few possibilities. It is not necessary that these operating parameters be directed measured, as they may be derived, calculated or otherwise discerned from other information. The operating parameters may be filtered, converted and/or otherwise processed before being evaluated and analyzed for their content (e.g., wheel speed readings may be acquired in the time domain and converted to the frequency domain, or they could be acquired in an analog form and converted to a digital one, etc.). It should also be appreciated that the aforementioned operating parameters only represent some of the potential types of information and data that may be gathered and used in step 104, as other types of operating parameters are certainly possible. For instance, accelerator pedal status, clutch pedal status, gear shifter selection, engine speed, engine torque, throttle valve position, and/or any other suitable operating parameter may be used in lieu of or in addition to the exemplary operating parameters cited here.

Next, step 106 uses the operating parameter(s) gathered in the previous step to assess one or more road surface condition(s). Road surface conditions, in this particularly case, generally relate to or address the frictional environment or interface between a road surface and a vehicle tire, and may be determined according to any number of different methods known in the art. Various factors can affect the road surface condition, including road surface composition and status (e.g., asphalt road surface versus gravel road surface, newer sharper road surface versus older smoother road surface, etc.), weather conditions (e.g., the presence of snow, ice, rain, etc. on the road surface), tire composition and status (e.g., worn out tires versus new tires), and the temperatures and/or humidity surrounding the road/tire interface, to cite a few potential factors. The road surface condition may be assessed by evaluating the coefficient of friction involving the road surface and the tire, commonly referred to as n. Generally, the lower the coefficient of friction for the road/tire interface, the more slippery the road will be and the higher the likelihood of wheel slip. For example, a dry asphalt road surface may have a coefficient of friction ($\mu$) of about 0.9, while an icy road may have a coefficient of friction ($\mu$) of about 0.1. In one embodiment, step 106 assesses the road surface condition and assigns the road surface a qualitative friction rating such as low, medium or high ($\mu$). The number of potential ratings or categories is generally driven by the level of accuracy required, and may be more or less than the three exemplary ratings provided here. This type of qualitative assessment may or may not involve performing actual coefficient of friction calculations and may use any combination of parameters and factors available to method 100. In another embodiment, step 106 quantitatively assesses the road surface condition of the road/tire interface and assigns the interface a value of some type, such as a coefficient of friction ($\mu$) rating. Any type of known technique for detecting, evaluating, analyzing and/or otherwise assessing road surface conditions may be employed here.

Step 108 monitors wheel slip according to one of a number of different techniques. In one embodiment, step 108 uses the operating parameter(s) gathered in step 104—which can include information from various wheel speed sensors—to determine if and when wheel slip is detected. This wheel slip monitoring can be applied to each wheel independently or to groups of wheels together. Skilled artisans will appreciate that various techniques can be used to detect and identify wheel slip and that step 108 may employ any such techniques. For instance, step 108 may compare different wheel speed readings with each other or compare wheel speed readings to other operating parameters, like vehicle speed, in order to shed light on the wheel slip situation. Instead of independently and directly monitoring wheel slip in step 108, it is possible for this step to receive wheel slip information from another component, device, module, system, etc. in the vehicle. For example, anti-lock brake system (ABS) module 20 can provide electronic brake control module (EBCM) 18 with an ABS input signal that indicates whether or not the ABS is active; typically, an active ABS suggests that some wheel slip has been detected. Of course, ABS module 20 is not the only component, module, system, etc. that can provide such information, as wheel slip information may originate from a number of sources in the vehicle. In any case, if no wheel slip is detected, then method 100 proceeds to step 116 which operates vehicle brake system 10 according to the requested brake torque. As an example, a brake command signal may be sent from EBCM 18 to hydraulic unit 22 where the brake command signal does not significantly alter the requested brake torque from the driver—beyond filtering, converting and/or other signal processing type steps. If wheel slip is detected, then method 100 proceeds to step 110 so that vehicle brake system 10 can be operated according to a modified brake torque that is less than the requested brake torque, as will be explained.

Step 110 determines the total brake torque being applied at the moment of wheel slip. In one embodiment, EBCM 18 gathers and records the total brake torque—which can include both frictional and regenerative brake torque—that is being applied at the moment that step 108 detects wheel slip at one or more of the wheels. If vehicle brake system 10 only employs traditional frictional braking (e.g., in non-regenerative vehicles), then step 110 may determine the total brake torque by gathering fluid pressure readings from hydraulic lines 48 and calculating the frictional brake torque from this. In such an embodiment, the total brake torque equals the frictional brake torque. If vehicle brake system 10 employs both frictional and regenerative braking (e.g., in regenerative vehicles), then step 110 may determine the total brake torque by computing the frictional brake torque, as described above, and estimating the regenerative brake torque (e.g., estimations may be based on wheel speed, acceleration, mass, road grade, motor current, motor speed, etc.). In this embodiment, the total brake torque equals the sum of the frictional and regenerative brake torques. Skilled artisans will appreciate that there are a number of different ways for determining frictional and/or regenerative brake torque and that any suitable technique for doing so may be used here. Step 110 may independently calculate the total brake torque or components of the brake torque, as just explained, or it may obtain this information from some other component, device, module and/or system in the vehicle, like ABS module 20. Of course, it is not necessary for step 110 to make its total brake torque determination at the exact and precise moment in time when wheel slip is initially detected. So long as the total brake torque is determined at a time that is generally contemporaneous with the beginning of the wheel slippage (the so-called entrance point of the slip), this is sufficient. The present method will continue to monitor or evaluate potential wheel slippage and brake torque in the event that there is an improvement or increase in the coefficient of friction ($\mu$) of the road surface, as described below.

Next, step 112 determines a modified brake torque that is less than the requested brake torque originally asked for by the driver. Stated differently, instead of simply operating the vehicle brake system 10 according to the requested brake torque, step 112 limits the brake torque that the vehicle brake system can apply during a wheel slip environment. Some of the reasons for modifying or limiting the requested brake torque in this way are addressed below. According to an exemplary embodiment, step 112 uses a two-dimensional lookup table with the road surface condition from step 106 as one input and the total brake torque at wheel slip from step 110 as another input to determine the modified brake torque. For instance, consider Table I which is an exemplary two dimensional look-up table that yields an offset value as an output.

TABLE I

|  |  | Total Brake Torque (N-M) | | | | | | | |
| --- | --- | --- | --- | --- | --- | --- | --- | --- | --- |
|  |  | 500 | 1,000 | 1,500 | 2,000 | 3,000 | 5,000 | 7,000 | 10,000 |
| Qualitative Friction Rating | Low $\mu$ | 220 | 300 | 400 | 600 | 1,000 | 1,500 | 2,000 | 2,000 |
|  | Medium $\mu$ | 500 | 500 | 750 | 1,250 | 2,000 | 3,000 | 3,000 | 3,000 |
|  | High $\mu$ | 1,000 | 1,600 | 2,400 | 4,800 | 5,000 | 5,000 | 5,000 | 5,000 |

The qualitative friction ratings from step 106 are shown on the vertical axis, and the total brake torque at wheel slip from step 110 is shown in the horizontal axis. In this particular embodiment, the output of Table I is an offset value which is then added to the total brake torque at wheel slip to equal the modified brake torque; see Equation 1.

Modified Brake Torque=Total Brake Torque+
  Offset Value  (Equation 1)

To illustrate the use of Table I, consider an example where the road surface has been assigned a medium μ friction rating (step 106) and the total brake torque at wheel slip is 1,500 N-M (step 110). Using these values, Table I returns an offset value of 750 N-M. Thus, the modified brake torque is 2,250 N-M (1,500 N-M+750 N-M=2,250 N-M). In a situation like this where the vehicle is on a medium μ road surface and the wheels are slipping, it is not uncommon for a driver to vigorously apply the brakes (i.e., to stomp on the brakes) and cause the requested brake torque to increase significantly (e.g., to exceed 8,000 N-M or more). For reasons discussed below, it may not be advantageous to drive vehicle brake system 10 at such a high brake torque when the wheels are already slipping and the antilock braking system (ABS) is active. Thus, the need to modify or limit the requested brake torque. Here a requested brake torque of 8,000 N-M is reduced to a modified brake torque of 2,250 N-M, which is then provided to hydraulic unit 22 in the form of a brake command signal. This type of modification or interruption to the brake control structure is available in brake-by-wire systems where there is a decoupling between the brake pedal and the actual vehicle brakes.

The preceding example is only an exemplary embodiment, as step 112 may utilize any number of different techniques and methods to determine a modified brake torque. For instance, step 112 may mathematically derive or calculate the modified brake torque instead of looking it up; it may use a look-up table that has a different number of dimensions or a different combination of inputs; or it may use data structures other than look-up tables. It is also possible for step 112 to use one or more look-up tables to obtain offset values for each wheel or for groups of wheels (e.g., front wheels, rear wheels, etc.) instead of determining a single offset value for all of the wheels. The various offset values may be empirically derived during development of the vehicle (e.g., static information that generally does not change) or they may be developed during the operational lifetime of the vehicle (e.g., dynamic information that is updated, modified, changed, etc.). The offset values may take into account other factors, such as: vehicle mass (e.g., if truck is hauling a significant load or not), powertrain types (e.g., front wheel drive, rear wheel drive, all wheel drive), and more. Even though exemplary Table I shows all offset values as positive numbers, it is possible for an offset value to be negative such that it is subtracted from the total brake torque in Equation 1. It is also possible for step 112 to utilize a lookup table that provides the modified brake torque directly, instead of providing an offset value that is then added to the total brake torque at wheel slip. These are only some of the possible variations and modifications of exemplary step 112 and Table I, whose values are provided here purely for purposes of illustration.

Step 114 compares the driver requested brake torque to the modified brake torque. If the requested brake torque is equal to or less than the modified brake torque, then control is passed to step 116 and the vehicle brake system is simply operated according to the requested brake torque. If the requested brake torque is greater than the modified brake torque—which is usually the case when the driver strenuously engages the brakes, as illustrated in the example above—then method 100 proceeds to step 118. Stated differently, step 114 causes vehicle brake system 10 to be driven with the lower of the two brake torque values (i.e., requested and modified brake torque values), and FIGS. 3A and 3B are meant to illustrate some of the reasoning behind this.

Figure 3A:
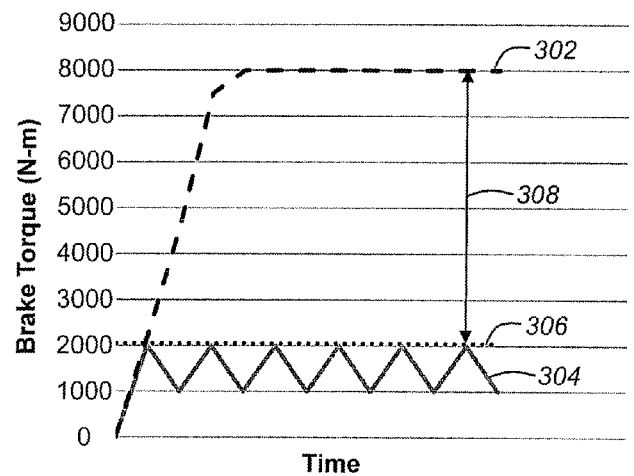
FIG. 3A is a graphic representation of a traditional antilock braking system (ABS) brake response.
Figure 3B:
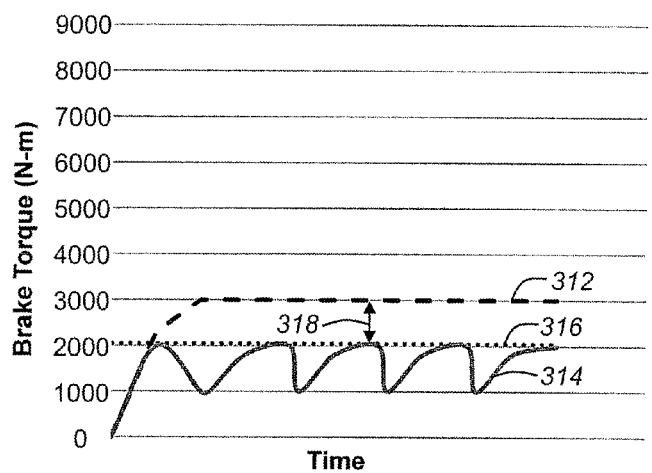
FIG. 3B is a graphic representation of an exemplary ABS brake response that may be produced by the method of FIG. 2.

Both FIGS. 3A and 3B show a brake response for a vehicle brake system that has an antilock braking system (ABS), is experiencing some degree of wheel slip, and is receiving an elevated requested brake torque from the driver (i.e., the driver is slamming on the brakes). In FIG. 3A the vehicle brake system does not use a method like method 100, and in FIG. 3B the vehicle brake system does use a method like method 100. Skilled artisans will appreciated that FIGS. 3A and 3B are simply meant to schematically illustrate certain attributes and characteristics of such systems, and are not meant to be exact plots or traces of actual brake responses. In FIG. 3A, plot 302 (broken line) represents the requested brake torque from the driver, plot 304 (solid line) represents the actual brake torque experienced out at the wheels (this sawtooth plot is generally being driven by the ABS), and plot 306 (dotted line) represents a target brake torque that the vehicle brake system, and specifically the ABS, is trying to achieve. As demonstrated, there is a substantial difference or delta 308 between the requested brake torque 302 (about 8,000 N-M in the example above) and the target brake torque 306. This difference 308 results in a significant pressure differential across one or more valves in hydraulic unit 22 (e.g., an isolation valve), and when such valves open—even if only for a minimum amount of time—the fluid pressure in hydraulic lines 48 quickly increases such that the actual brake torque 304 quickly surpasses the target brake torque level 306. When these large pressure steps or increases happen, the ABS will open one or more valves in hydraulic unit 22 (e.g., dump valves) in order to bring the actual brake torque 304 back down; again, the ABS is trying to maintain the actual brake torque 304 at or around the target brake torque level 306. This rapid pulsing behavior produces the sawtooth response 304 and results in a situation where the actual brake torque spends little time near the target brake torque level 306. The sharp points or tops of sawtooth curve 304 show how little time is spent at or near the target brake torque level 306 before rapidly decreasing again.

The brake response of FIG. 3B, on the other hand, exhibits a much smaller difference 318 between a modified brake torque 312 and a target brake torque 316. This is primarily due to the fact that method 100 provides a modified brake torque that is less than—in this case, significantly less than—the requested brake torque. Because the corresponding valve in hydraulic unit 22 has a much smaller pressure differential across it, it is able to operate in a more controlled and fine-tuned manner. Thus, the vehicle brake system of FIG. 3B is able to manipulate the actual brake torque 314 more finely and maintain it at or near the target brake torque level 316 for a greater amount of time. This explains why actual brake torque 314 has more of an 'ocean wave' or 'shark fin' profile as opposed to the 'sawtooth' profile of FIG. 3A. The component of the actual brake torque 314 that is near the target brake torque level 316 provides improved wheel and vehicle deceleration. Those skilled in the art will appreciate that a number of different techniques, algorithms, methods, etc. exist for controlling an ABS and producing plots 314 and 316, and that any of these may be used here (e.g., techniques using known mu/wheel slip relationships). In one sense, method 100 is not meant to replace or supplant the algorithms used by the ABS system, rather it is meant to modify, limit or otherwise manipulate the requested brake torque so that if the ABS intervenes in a braking event to prevent wheel lockup, the braking performance will be improved. In addition to potentially improving the braking performance of the vehicle brake system, method 100 may offer a smoother deceleration, quieter braking and better fuel economy (it requires energy for hydraulic unit 22 to maintain a high boost pressure at the elevated requested brake torque level 302 shown in FIG. 3A; this is true even though the high boost pressure is not needed).

Step 118 operates the vehicle brake system according to the modified brake torque, which is less than the requested brake torque asked for by the driver. In an exemplary embodiment, EBCM 18 provides a brake command signal to hydraulic unit 22, where the brake command signal includes the modified brake torque. As previously explained, the modified brake torque may be equal to the sum of a total brake torque at wheel slip and an offset value. One potential reason for adding the offset value is so that vehicle brake system 10 will be ready in the event that there is an improvement or increase in the coefficient of friction μ of the road surface (i.e., a low to high μ transition). If such a transition occurs, the modified brake torque is already asking for slightly more brake torque than is needed, and therefore will be ready to quickly respond and take advantage of the improved road surface condition. Skilled artisans will appreciate that the boost pressure in hydraulic unit 22 cannot be significantly increased instantaneously, thus, having some extra boost pressure in reserve may be beneficial.

In a different brake-by-wire embodiment, step 118 sends corresponding brake command signals to a control unit or driver in an electromechanical braking (EMB) system so that electric calipers control a brake torque or brake force according to the modified brake torque. In another embodiment, the modified brake torque is not implemented instantaneously and abruptly, but is smoothed in through a linear equation or a first-order filter, to name but a few examples. These are only some of the possibilities, as other techniques may be used to control a vehicle brake system with appropriate brake command signals.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for operating a vehicle brake system, comprising the steps of:
    (a) receiving a requested brake torque;
    (b) monitoring wheel slip; and
    (c) if no wheel slip is detected then operating the vehicle brake system according to the requested brake torque, and if wheel slip is detected then determining a total brake torque being applied at the moment of wheel slip and using the total brake torque applied at the moment of wheel slip to determine a modified brake torque that is less than the requested brake torque so that a pressure differential across one or more valves in the vehicle brake system can be reduced, and operating the vehicle brake system according to the modified brake torque.

2. The method of claim 1, wherein step (a) further comprises receiving a brake input signal from a brake pedal sensor where the brake input signal is representative of the requested brake torque.

3. The method of claim 1, further comprising the steps of:
    (i) gathering one or more operating parameter(s) from around the vehicle;
    (ii) using the operating parameter(s) to assess a road surface condition; and
    (iii) using the total brake torque applied at the moment of wheel slip and the assessed road surface condition to determine the modified brake torque in step (c).

4. The method of claim 3, wherein step (i) further comprises gathering one or more operating parameter(s) from the group consisting of: wheel speed, wheel acceleration, vehicle speed, vehicle acceleration, frictional brake torque, regenerative brake torque, tire pressure, vehicle mass, road grade or outside weather conditions.

5. The method of claim 3, wherein step (ii) further comprises using the operating parameter(s) to assess the road surface condition and assign the road surface a qualitative friction rating.

6. The method of claim 3, wherein step (iii) further comprises using the assessed road surface condition and the total brake torque applied at the moment of wheel slip with a look-up table to determine the modified brake torque.

7. The method of claim 1, further comprising the steps of:
    (i) gathering one or more operating parameter(s) from around the vehicle; and
    (ii) using the operating parameter(s) to monitor wheel slip.

8. The method of claim 7, wherein step (i) further comprises gathering one or more operating parameter(s) from the group consisting of: wheel speed, wheel acceleration, vehicle speed, vehicle acceleration, frictional brake torque, regenerative brake torque, tire pressure, vehicle mass, road grade or outside weather conditions.

9. The method of claim 1, wherein step (c) further comprises determining the total brake torque applied at the moment of wheel slip by adding together a frictional brake torque and a regenerative brake torque.

10. The method of claim 1, wherein step (c) further comprises using the total brake torque applied at the moment of wheel slip and an assessed road surface condition with a look-up table to determine the modified brake torque.

11. The method of claim 1, wherein the modified brake torque equals the sum of an offset value and the total brake torque applied at the moment of wheel slip.

12. The method of claim 1, wherein the vehicle brake system is a brake-by-wire system and includes a brake pedal sensor that provides a brake input signal, an antilock braking system (ABS) module that provides an ABS input signal, an electronic brake control module (EBCM) that receives the brake input signal and the ABS input signal and uses both the brake input signal and the ABS input signal to provide a brake command signal, and a hydraulic unit that receives the brake command signal and controls the frictional brake torque of the vehicle brake system according to the brake command signal.

13. A method for operating a vehicle brake system that is a brake-by-wire system and has an antilock braking system (ABS), comprising the steps of:
   (a) receiving a requested brake torque from a brake pedal sensor;
   (b) assessing a road surface condition;
   (c) monitoring wheel slip, if wheel slip is detected then determining a total brake torque being applied at the moment of wheel slip;
   (d) using the assessed road surface condition from step (b) and the total brake torque at the moment of wheel slip from step (c) to determine a modified brake torque that is less than the requested brake torque; and
   (e) operating the vehicle brake system according to the modified brake torque so that the difference between the modified brake torque and a target brake torque from the ABS is smaller than the difference between the requested brake torque and the target brake torque.

* * * * *